(12) United States Patent
Umeki et al.

(10) Patent No.: US 10,857,861 B2
(45) Date of Patent: Dec. 8, 2020

(54) SUNROOF DEVICE

(71) Applicant: AISIN SEIKI KABUSHIKI KAISHA, Kariya (JP)

(72) Inventors: Takayuki Umeki, Novi, MI (US); Katsura Inoue, Chiryu (JP); Naohiro Takami, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 62 days.

(21) Appl. No.: 16/381,609

(22) Filed: Apr. 11, 2019

(65) Prior Publication Data

US 2019/0315205 A1    Oct. 17, 2019

(30) Foreign Application Priority Data

Apr. 12, 2018  (JP) ................. 2018-077073

(51) Int. Cl.
| | |
|---|---|
| *B60J 7/053* | (2006.01) |
| *B60J 7/02* | (2006.01) |
| *B60J 7/043* | (2006.01) |
| *B60J 7/057* | (2006.01) |
| *E05F 15/655* | (2015.01) |

(52) U.S. Cl.
CPC ............. *B60J 7/024* (2013.01); *B60J 7/0435* (2013.01); *B60J 7/053* (2013.01); *B60J 7/0573* (2013.01); *E05F 15/655* (2015.01); *E05Y 2900/542* (2013.01)

(58) Field of Classification Search
CPC .................................. B60J 7/024; B60J 7/053
USPC .................................................. 296/221–223
See application file for complete search history.

(56) References Cited

U.S. PATENT DOCUMENTS

| | | | | |
|---|---|---|---|---|
| 6,890,025 B2 * | 5/2005 | Hanke | ....................... | B60J 7/02 296/216.08 |
| 7,537,278 B2 * | 5/2009 | Seifert | ....................... | B60J 7/02 296/216.08 |
| 9,290,086 B2 * | 3/2016 | Ohdoi | ....................... | B60J 7/05 |

FOREIGN PATENT DOCUMENTS

JP    2013-216244    10/2013

* cited by examiner

*Primary Examiner* — Dennis H Pedder
(74) *Attorney, Agent, or Firm* — Finnegan, Henderson, Farabow, Garrett & Dunner, LLP (57) ABSTRACT

A sunroof device includes: a guide rail provided on each edge portion of an opening formed in a roof of a vehicle in a width direction; a sliding member supported on the guide rail so as to be slidable in a longitudinal direction of the vehicle; and a support member provided with a first elastic member and having a front end portion supported on the guide rail so as to be rotatable and slidable in the longitudinal direction of the vehicle, the support member supporting a movable panel that opens and closes the opening, in which the sliding member includes a bottom wall located above the guide rail, a vertical wall provided upright on the bottom wall, and an engaging portion provided on the vertical wall, the support member includes a guide portion engaged with the engaging portion, and the guide portion including first and second guide portions.

8 Claims, 3 Drawing Sheets

VEHICLE INNER SIDE ←——→ VEHICLE OUTER SIDE
WIDTH DIRECTION

FIG.5

SUNROOF DEVICE

CROSS REFERENCE TO RELATED APPLICATIONS

This application is based on and claims priority under 35 U.S.C. § 119 to Japanese Patent Application 2018-077073, filed on Apr. 12, 2018, the entire contents of which are incorporated herein by reference.

TECHNICAL FIELD

This disclosure relates to a sunroof device.

BACKGROUND DISCUSSION

In the related art, there has been known, for example, a sunroof device disclosed in JP2013-216244A (paragraphs [0046]-[0054] and FIGS. 8 to 11) (Reference 1). Such a sunroof device includes a pair of guide rails provided on both edge portions of an opening formed in a roof of a vehicle in the width direction of the vehicle so as to extend in the longitudinal direction and a pair of sliding members (sliders) supported on the two guide rails so as to be slidable in the longitudinal direction of the vehicle. Then, a movable panel (roof panel) is connected to each of the two sliding members via a support member. That is, each sliding member is provided with an engaging portion, and each support member is provided with a guide portion (cam portion) that extends in the longitudinal direction of the vehicle. The movable panel is kept in posture with respect to the roof when the engaging portion of each sliding member and the guide portion of each support member are engaged with each other.

In such a configuration, when the movable panel is in the fully closed state of closing the opening, a front pin provided on each support member is engaged with a first guide groove in a first guide member provided on each guide rail, so that movement of the movable panel as well as each support member is restricted in the longitudinal direction of the vehicle. When each sliding member moves to the front of the vehicle in this state, the movable panel performs a tilt up operation of rotating, together with each support member having the guide portion pressed against the engaging portion, in a given direction about a front portion thereof, so that a rear portion thereof moves upward.

Meanwhile, when each sliding member moves to the rear of the vehicle in the fully closed state of the movable panel, the movable panel performs a tilt down operation of rotating, together with each support member having the guide portion pressed against the engaging portion, in an opposite direction about the front portion thereof, so that the rear portion thereof moves downward. At this time, the front pin and a rear pin provided on each support member are introduced into a second guide groove in a second guide member provided on each guide rail respectively through the first guide groove and the second guide groove of each guide rail. According to this, the front pin and the rear pin come into contact with a lower wall of the second guide groove, so that the tilt down operation of the movable panel is restricted and transition to a tilt down state is completed. At the same time, the front pin and the rear pin located in the second guide groove of each guide rail are permitted to move to the rear of the vehicle.

When each sliding member further moves to the rear of the vehicle in this state, the movable panel moves, together with each support member having the guide portion pressed against the engaging portion, to the rear of the vehicle in the tilt down state to open the opening.

Meanwhile, in Reference 1, the posture of the movable panel in the tilt down state (the amount of downward movement of the rear portion of the movable panel) is determined when the front pin and the rear pin come into contact with the lower wall of the second guide groove. In other words, in order for the movable panel to complete transition to the tilt down state, mechanical restriction by the contact between the front pin and the rear pin and the lower wall of the second guide groove, for example, is necessary. When such a mechanical restriction is performed, striking sound may occur.

Thus, a need exists for a sunroof device which is not susceptible to the drawback mentioned above.

SUMMARY

A sunroof device according to an aspect of this disclosure includes a guide rail provided on each edge portion of an opening formed in a roof of a vehicle in a width direction of the vehicle, a sliding member supported on the guide rail so as to be slidable in a longitudinal direction of the vehicle, and a support member provided with a first elastic member and having a front end portion supported on the guide rail so as to be rotatable and slidable in the longitudinal direction of the vehicle, the support member supporting a movable panel that opens and closes the opening, in which the sliding member includes a bottom wall located above the guide rail, a vertical wall provided upright on the bottom wall, and an engaging portion provided on the vertical wall, the support member includes a guide portion engaged with the engaging portion, the guide portion including a first guide portion that extends obliquely upward and rearward of the vehicle in a fully closed state where the movable panel closes the opening and a second guide portion that is connected to a rear end of the first guide portion and extends obliquely upward and rearward of the vehicle and more steeply than the first guide portion, and, when the sliding member moves to a rear of the vehicle with respect to the support member in the fully closed state, the engaging portion presses the guide portion to cause a tilt down operation of the movable panel, the first elastic member comes into contact with the bottom wall in a first state where the engaging portion presses the first guide portion, and the first elastic member restricts movement of the sliding member to the rear of the vehicle with respect to the support member in a second state where the engaging portion that has passed through the first guide portion while elastically deforming the first elastic member and has entered the second guide portion presses the second guide portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a sunroof device will be described. In addition, in the following description, the longitudinal direction of a vehicle will be referred to as "longitudinal direction", and the upper side and the lower side in the height direction of the vehicle will be referred to as "upward" and "downward", respectively. In addition, the inner side in the width direction of the vehicle toward the inside of a vehicle room will be referred to as "vehicle inner side", and the outer side in the width direction of the vehicle toward the outside of the vehicle room will be referred to as "vehicle outer side".

Figure 1:
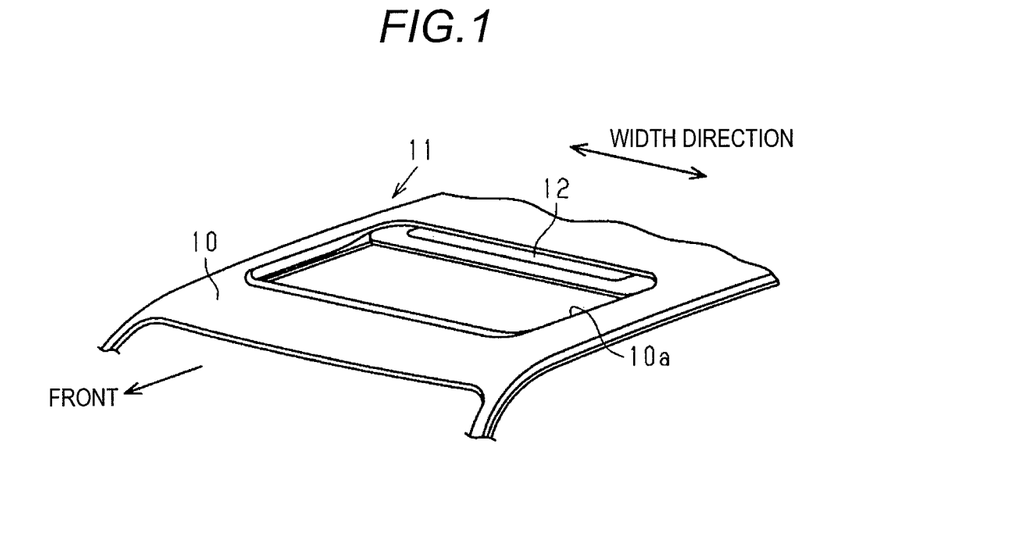
FIG. 1 is a perspective view illustrating a structure of a sunroof device according to an embodiment.

As illustrated in FIG. 1, a roof 10 of a vehicle such as an automobile is formed with an opening 10a having a substantially rectangular shape and is equipped with a sunroof device 11. The sunroof device 11 includes a movable panel 12 having a substantially rectangular shape, the movable panel 12 being formed of, for example, a glass plate that moves in the longitudinal direction to open or close the opening 10a.

The movable panel 12 is provided to perform a tilt up operation of rotating about a front portion thereof in a given direction so that a rear portion thereof moves upward, a tilt down operation of rotating about the front portion thereof in an opposite direction so that the rear portion thereof moves downward, and a sliding operation in the longitudinal direction. In an opening/closing operation of the movable panel 12, a so-called inner sliding type is adopted, in which the movable panel 12 slides in a tilt down state.

Figure 2:
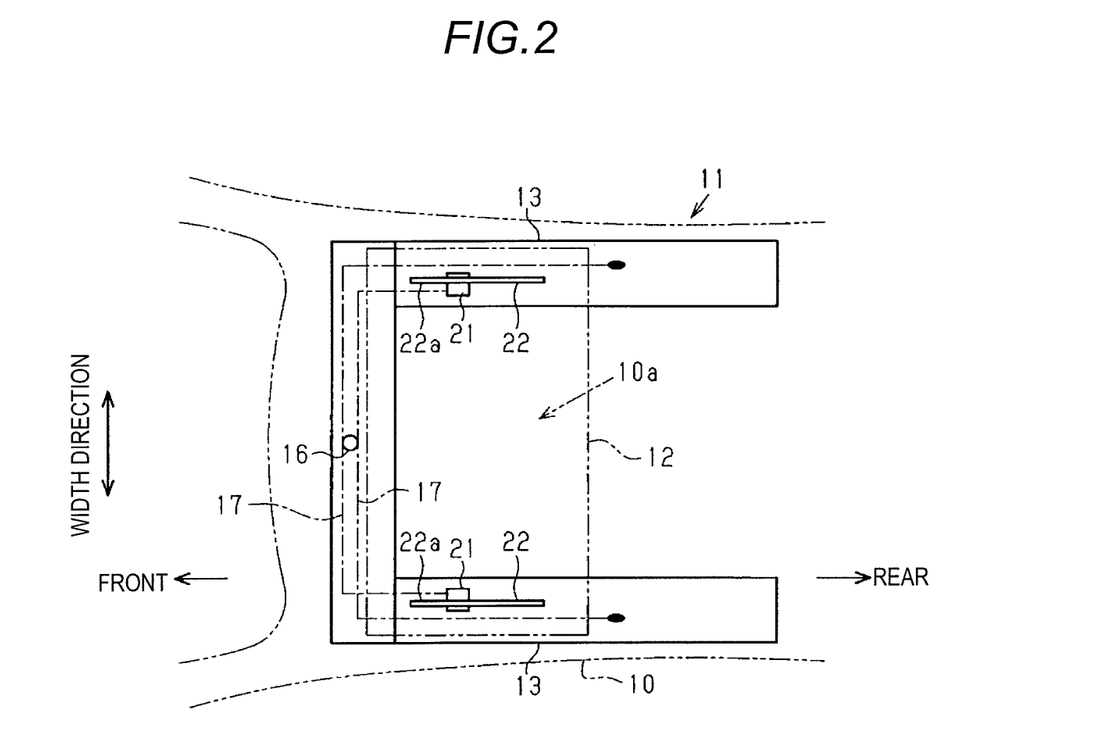
FIG. 2 is a plan view illustrating the structure of the sunroof device according to the embodiment.

As illustrated in FIG. 2, a pair of guide rails 13 are provided on both edge portions of the opening 10a in the width direction of the vehicle so as to extend in the longitudinal direction. Each guide rail 13 is formed of, for example, an extruded aluminum alloy material and has a constant cross section in the longitudinal direction thereof. Then, rear shoes 21 as a pair of sliding members are guided and supported on the respective guide rails 13 so as to be slidable in the longitudinal direction.

In addition, support brackets 22 having a substantially elongated shape as a pair of support members are supported on the respective guide rails 13 to extend in the longitudinal direction and support both edge portions of the movable panel 12 in the width direction of the vehicle. That is, a front end portion 22a of each support bracket 22 is supported on the guide rail 13 so as to be rotatable around an axis which extends in the width direction of the vehicle at a position forward of the vehicle than the rear shoe 21 and be slidable in the longitudinal direction. Then, each support bracket 22 is engaged with and supported by the rear shoe 21. The two rear shoes 21 cause the movable panel 12 supported on the two support brackets 22 to perform the tilt up operation, the tilt down operation, or the sliding operation according to the movement thereof in the longitudinal direction.

In addition, for example, an electric motor 16 having an output gear is provided on the vehicle in front of the two guide rails 13. The electric motor 16 is connected to each rear shoe 21 via each of a pair of belts 17 having a substantially band shape, and simultaneously moves the two rear shoes 21 in the longitudinal direction along the guide rails 13.

Figure 3:
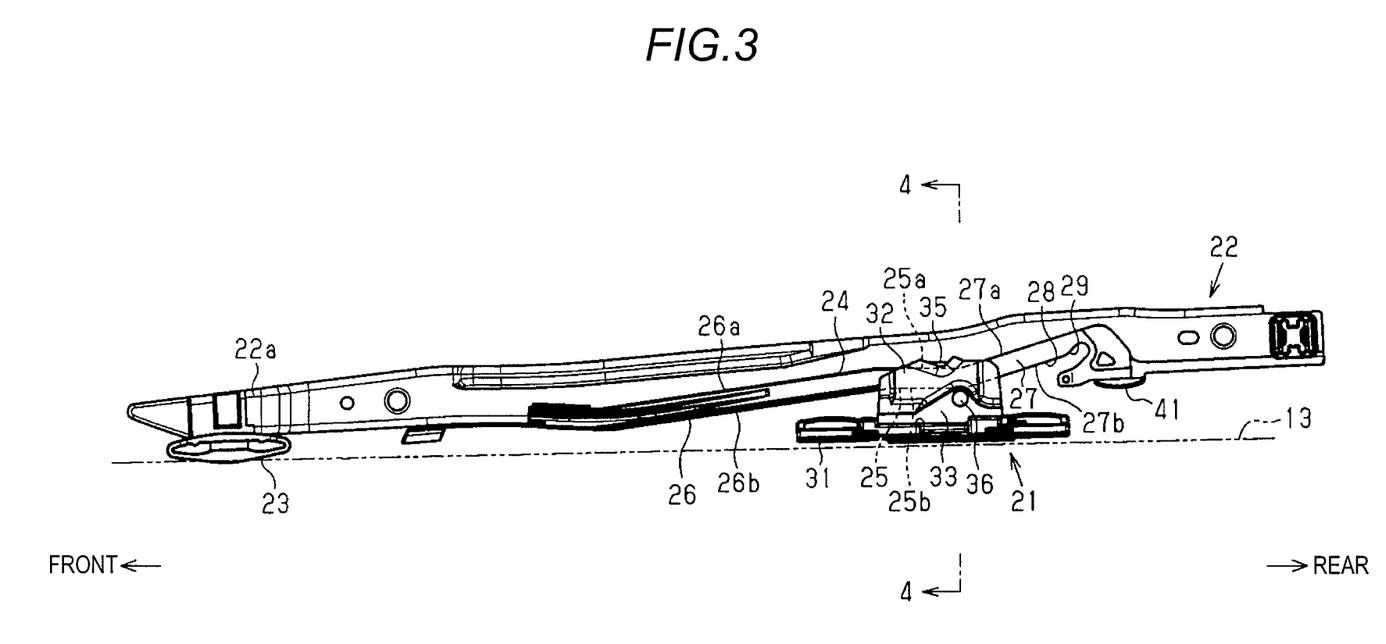
FIG. 3 is a side view illustrating the structure of the sunroof device according to the embodiment.
Figure 4:
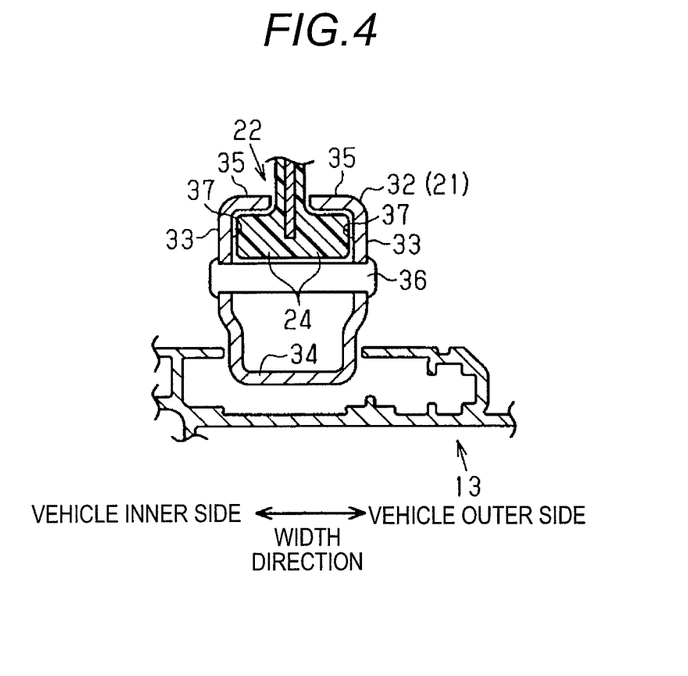
FIG. 4 is a cross-sectional view taken along line 4-4 of FIG. 3.

As illustrated in FIGS. 3 and 4, each rear shoe 21 is formed of, for example, an insert molded body in which a portion of a metal plate is wrapped with a resin material, and includes a shoe portion 31 mounted on the guide rail 13 so as to be slidable in the longitudinal direction and a body portion 32 provided upright on the shoe portion 31. Then, the body portion 32 includes a pair of vertical walls 33 provided in parallel in the width direction of the vehicle above the guide rail 13, a bottom wall 34 interconnecting the lower ends of the two vertical walls 33 in the width direction of the vehicle, and a pair of engaging flanges 35 protruding from the upper ends of the two vertical walls 33 in the width direction of the vehicle so as to be close to each other. Then, an engaging pin 36 is supported on the body portion 32 and penetrates the two vertical walls 33 so as to extend between the two vertical walls 33 in the width direction of the vehicle. The body portion 32 forms, above the engaging pin 36, a pair of engaging recesses 37 having a substantially U-shaped groove shape as engaging portions which are open so as to be opposite each other in the width direction of the vehicle. The two engaging flanges 35, the engaging pin 36, and the two engaging recesses 37 constitute an engaging portion.

Meanwhile, each support bracket 22 is formed of, for example, an insert molded body in which a portion of a metal plate is wrapped with a resin material, and extends in the longitudinal direction on the rear shoe 21. Then, each support bracket 22 is supported on the guide rail 13 so as to be rotatable around the axis which extends in the width direction of the vehicle and be slidable in the longitudinal direction via a front shoe 23 which is provided on the front end portion 22a and has a substantially oval shape. In addition, the support bracket 22 includes, at a position rearward of the vehicle than the front shoe 23, a pair of guide protrusions 24 having a substantially linear shape which protrude from the lower end of the support bracket 22 so as to be opposite each other in the width direction of the vehicle. The support bracket 22 is engaged with the rear shoe 21 when the two guide protrusions 24 are engaged between the two engaging flanges 35 and the engaging pin 36 (in the two engaging recesses 37) provided on the rear shoe 21 (the body portion 32), so that movement of the support bracket 22 in the vertical direction is restricted and relative movement of the two guide protrusions 24 along the longitudinal direction thereof (substantially the longitudinal direction) is permitted.

Each guide protrusion 24 has a flat portion 25 which extends substantially horizontally in substantially the longitudinal direction when the movable panel 12 is in the fully closed state, a front inclined portion 26 which is connected to the front end of the flat portion 25 and extends obliquely downward and forward of the vehicle, and a rear inclined portion 27 which is connected to the rear end of the flat portion 25 and extends obliquely upward and rearward of the vehicle in a substantially linear shape. The upper surfaces of the flat portion 25, the front inclined portion 26, and the rear inclined portion 27 respectively form upper guide surfaces 25a, 26a and 27a which are in slidable contact with the engaging flanges 35, and the lower surfaces thereof respectively form lower guide surfaces 25b, 26b and 27b which are in slidable contact with the engaging pin 36.

Figure 5:
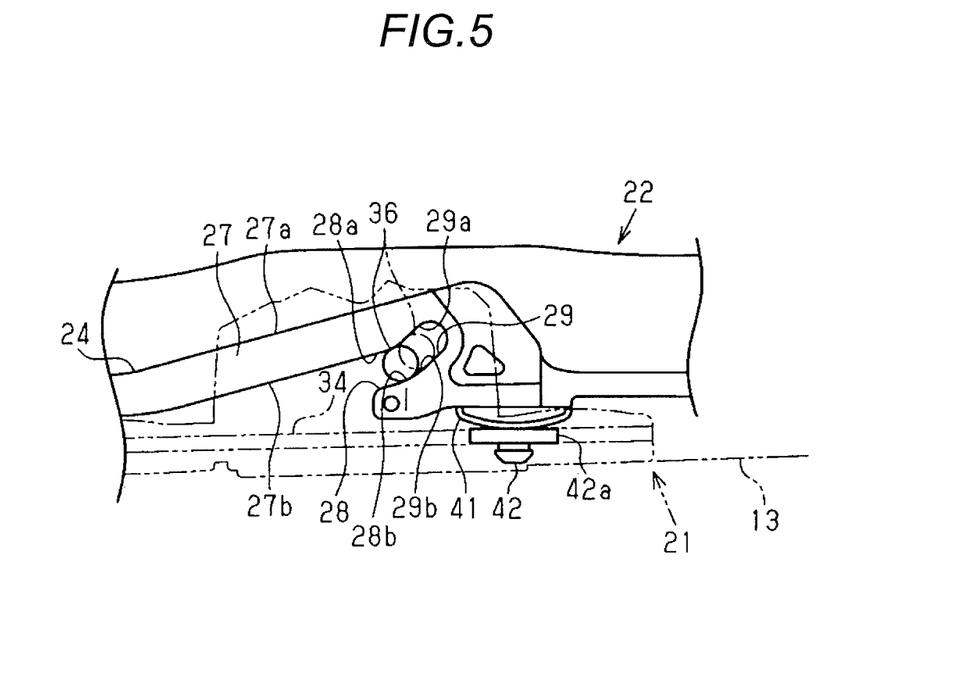
FIG. 5 is a side view illustrating an action of the sunroof device according to the embodiment.

In addition, as illustrated in the enlarged view of FIG. 5, each support bracket 22 is formed with a first guide recess 28 at a position rearward of the vehicle than the guide protrusion 24 (the rear inclined portion 27), and is also formed with a second guide recess 29 at a position rearward of the vehicle than the first guide recess 28. The first guide recess 28 and the second guide recess 29 constitute, together with the two guide protrusions 24, a guide portion.

The upper inner wall surface of the first guide recess 28 forms a first upper guide surface 28a which is connected to the rear end of the lower guide surface 27b so as to extend in a substantially linear shape along the lower guide surface 27b, and the lower inner wall surface thereof forms a first lower guide surface 28b which extends substantially parallel to the first upper guide surface 28a below the first upper guide surface 28a. Similarly, the upper inner wall surface of the second guide recess 29 forms a second upper guide surface 29a which is connected to the rear end of the first upper guide surface 28a so as to extend obliquely upward and rearward of the vehicle in a substantially linear shape and more steeply than the first upper guide surface 28a, and the lower inner wall surface thereof forms a second lower guide surface 29b which extends substantially parallel to the second upper guide surface 29a below the second upper guide surface 29a. That is, the inclination angle of the first guide recess 28 (and the rear inclined portion 27) with respect to the flat portion 25 is set to be smaller than the inclination angle of the second guide recess 29 with respect to the flat portion 25. The distance between the first upper guide surface 28a and the first lower guide surface 28b and the distance between the second upper guide surface 29a and the second lower guide surface 29b in the height direction of the vehicle are respectively set to be substantially equal to the diameter of the engaging pin 36.

A resin deflective portion 41 as a first elastic member is integrally provided on the lower end of each support bracket 22 at a position rearward of the vehicle than the second guide recess 29. The deflective portion 41 is formed in a substantially arcuate shape so as to protrude downward and has front and rear ends fixed to and supported on the support bracket 22. Meanwhile, a rubber buffer body 42 as a second elastic member is provided on the bottom wall 34 of the rear shoe 21. The buffer body 42 has a pressed portion 42a having a substantially flat plate shape which is widened at substantially the same height as the upper surface of the bottom wall 34. In addition, the elastic modulus of the deflective portion 41 in the height direction of the vehicle is set to be smaller than that of the buffer body 42.

Here, as illustrated in FIG. 3, when the movable panel 12 is in the fully closed state, the rear shoe 21 (e.g., the engaging flanges 35) is disposed at the position of the flat portion 25 in the longitudinal direction.

Thus, when the rear shoe 21 moves to the front of the vehicle along the guide rail 13 and enters the front inclined portion 26 in the fully closed state of the movable panel 12, the support bracket 22 is pushed up at the guide protrusion 24 (the lower guide surface 26b) by the engaging pin 36. Thus, the support bracket 22 rotates about the front end portion 22a (the front shoe 23) in a given direction (the counterclockwise direction in FIG. 3). At this time, the movable panel 12 performs a tilt up operation in which the rear portion thereof moves upward with respect to the front portion thereof. Then, when the rear shoe 21 reaches the terminating end (front end) of the front inclined portion 26, the movable panel 12 stops the tilt up operation and enters a tilt up state.

In addition, when the rear shoe 21 moves to the rear of the vehicle along the guide rail 13 in the tilt up state of the movable panel 12, the support bracket 22 is pushed down at the front inclined portion 26 (the upper guide surface 26a) by the engaging flanges 35, thereby rotating about the front end portion 22a in an opposite direction (the clockwise direction in FIG. 3). Then, when the rear shoe 21 further moves to the rear of the vehicle along the guide rail 13 and enters the flat portion 25, the support bracket 22 stops the rotation thereof about the front end portion 22a and the movable panel 12 returns to the fully closed state.

Meanwhile, when the rear shoe 21 moves to the rear of the vehicle along the guide rail 13 and enters the rear inclined portion 27 in the fully closed state of the movable panel 12, the support bracket 22 is pushed down at the guide protrusion 24 (the upper guide surface 27a) by the engaging flanges 35, thereby rotating about the front end portion 22a in the opposite direction (the clockwise direction in FIG. 3). Alternatively, when the rear shoe 21 further moves to the rear of the vehicle along the guide rail 13 and passes through the rear inclined portion 27 and the engaging pin 36 is introduced into the first guide recess 28, the support bracket 22 is pushed down at the first guide recess 28 (the first lower guide surface 28b) by the engaging pin 36. Thus, the support bracket 22 further rotates about the front end portion 22a in the opposite direction. At this time, the movable panel 12 performs a tilt down operation in which the rear portion thereof moves downward with respect to the front portion thereof. As already described above, the inclination angle of the rear inclined portion 27 and the first guide recess 28 is smaller than the inclination angle of the second guide recess 29, so that the amount of downward movement, i.e., the speed of the downward movement, of the rear portion of the movable panel 12 is smaller than the amount of movement of the rear shoe 21 at this time.

In addition, as illustrated in FIG. 5, in a state where the rear shoe 21 passes through the rear inclined portion 27 and the engaging pin 36 is introduced into the first guide recess 28 (in a first state), the bottom wall 34 of the body portion 32 reaches below the deflective portion 41 and the deflective portion 41 comes into contact with the buffer body 42 (the pressed portion 42a). That is, the buffer body 42 is provided on the bottom wall 34 at a contact position where the deflective portion 41 comes into contact with the buffer body 42. Thus, when the rear shoe 21 further moves to the rear of the vehicle along the guide rail 13 in this state, the support bracket 22 is pushed down at the first guide recess 28 (the first lower guide surface 28b) by the engaging pin 36, thereby further rotating about the front end portion 22a in the opposite direction while elastically deforming both the deflective portion 41 and the buffer body 42 so as to compress the two in the height direction of the vehicle. Alternatively, when the rear shoe 21 further moves to the rear of the vehicle along the guide rail 13 and the engaging pin 36 passes through the first guide recess 28 and is introduced into the second guide recess 29, the support bracket 22 is pushed down at the second guide recess 29 (the second lower guide surface 29b) by the engaging pin 36. Thus, the support bracket 22 further rotates about the front end portion 22a in the opposite direction while elastically deforming both the deflective portion 41 and the buffer body 42 so as to compress the two in the height direction of the vehicle. As already described above, when the rear shoe 21 is located on the rear inclined portion 27 or in the first guide recess 28, the speed of downward movement of the rear portion of the movable panel 12 is smaller than the amount of movement of the rear shoe 21. Thus, during the period until the deflective portion 41 comes into contact with the buffer body 42 or at the initial stage at which the deflective portion 41 and the buffer body 42 begin to elastically deform according to the contact therebetween, the rear portion of the movable panel 12 moves downward at a relatively low speed.

Then, in a state where the engaging pin 36 is introduced into the second guide recess 29 (in a second state), when the deflective portion 41 and the buffer body 42 are difficult to elastically deform according to the rotation of the support bracket 22, the rotation of the support bracket 22 is restricted and the movement of the rear shoe 21 to the rear of the vehicle with respect to the support bracket 22 is restricted. At this time, the tilt down operation of the movable panel 12 supported on each support bracket 22 is restricted, and transition to a tilt down state is completed. In other words, the posture of the movable panel 12 in the tilt down state (the amount of downward movement of the rear portion of the movable panel 12) is determined when the deflective portion 41 and the buffer body 42 are difficult to elastically deform as described above. Such a mechanical restriction by the deflective portion 41 and the buffer body 42 is performed by buffering caused by the elastic deformation of the deflective portion 41 and the buffer body 42, so that the occurrence of striking sound is prevented.

In this state, when the rear shoe 21 further moves to the rear of the vehicle along the guide rail 13, the support bracket 22 is pressed at the second guide recess 29 (the second lower guide surface 29*b*) by the engaging pin 36, thereby moving to the rear of the vehicle together with the rear shoe 21. At this time, the movable panel 12 supported on each support bracket 22 moves to the rear of the vehicle in the tilt down state (to perform an opening operation) and enters a fully opened state of opening the opening 10*a*.

As already described above, since the second guide recess 29 is steeper than the first guide recess 28, for example, a rearward component of the press force to the second guide recess 29 by the engaging pin 36 is relatively increased at this time. Therefore, an increase in the load of the rear shoe 21 (the electric motor 16) is prevented.

In addition, when the rear shoe 21 moves to the front of the vehicle along the guide rail 13 in the fully opened state of the movable panel 12, the support bracket 22 is pressed at the second guide recess 29 (the second upper guide surface 29*a*) by the engaging pin 36, thereby moving, together with the rear shoe 21, to the front of the vehicle. At this time, the movable panel 12 supported on each support bracket 22 moves to the front of the vehicle in the tilt down state (to perform a closing operation).

According to this, when the movable panel 12 returns to the above-described state where transition to the tilt down state is completed, by the further movement of the rear shoe 21 to the front of the vehicle, the support bracket 22 is sequentially pushed up at the second guide recess 29 (the second upper guide surface 29*a*), the first guide recess 28 (the first upper guide surface 28*a*), and the rear inclined portion 27 (the lower guide surface 27*b*) by the engaging pin 36. Thus, the support bracket 22 rotates about the front end portion 22*a* in the given direction (the counterclockwise direction in FIG. 3). Then, when the rear shoe 21 further moves to the front of the vehicle along the guide rail 13 and enters the flat portion 25, the support bracket 22 stops the rotation thereof about the front end portion 22*a* and the movable panel 12 returns to the fully closed state.

Actions and effects of the present embodiment will be described.

(1) In the present embodiment, when the rear shoe 21 moves to the rear of the vehicle with respect to the support bracket 22 in the fully closed state, for example, the engaging recess 37 presses, for example, the guide protrusion 24 to cause the tilt down operation of the movable panel 12. At this time, in a state where the engaging pin 36 presses the first guide recess 28 (in the first state), the deflective portion 41 comes into contact with the bottom wall 34 (the buffer body 42). Thus, during the period until a state where the engaging pin 36 presses the second guide recess 29 (the second state), the deflective portion 41 is elastically deformed while being pressed against the bottom wall 34 according to the tilt down operation of the movable panel 12. Then, in the state where the engaging pin 36 presses the second guide recess 29 (in the second state), the deflective portion 41 restricts the movement of the rear shoe 21 to the rear of the vehicle with respect to the support bracket 22. At this time, the tilt down operation of the movable panel 12 is restricted, and transition to the tilt down state is completed. When the rear shoe 21 further moves to the rear of the vehicle in this state, the movable panel 12 moves, together with the support bracket 22 having the second guide recess 29 pressed by the engaging pin 36, to the rear of the vehicle in the tilt down state to open the opening 10*a*.

Here, when the engaging pin 36 presses the first guide recess 38, since the first guide recess 28 is not steeper than the second guide recess 29, the amount of downward movement, i.e., the speed of downward movement, of the rear portion of the movable panel 12 is smaller than the amount of movement of the rear shoe 21. Thus, the deflective portion 41 comes into contact with the bottom wall 34 (the buffer body 42) in a state where the movable panel 12 relatively slowly performs the tilt down operation. That is, restriction in the movement of the rear shoe 21 to the rear of the vehicle with respect to the support bracket 22 by the deflective portion 41 begins in a state where the movable panel 12 relatively slowly performs the tilt down operation. Then, the deflective portion 41 is elastically deformed while being pressed against the bottom wall 34 until transition to the tilt down state of the movable panel 12 is completed. Thus, it is possible to prevent the occurrence of striking sound when transition to the tilt down state of the movable panel 12 is completed.

Meanwhile, restriction in the movement of the rear shoe 21 to the rear of the vehicle with respect to the support bracket 22 by the deflective portion 41, i.e., transition to the tilt down state of the movable panel 12, is completed while the engaging pin 36 is pressing the second guide recess 29. Then, movement of the movable panel 12 to the rear of the vehicle in the tilt down state (opening operation) is performed when the engaging pin 36 presses the second guide recess 29. At this time, since the second guide recess 29 is steeper than the first guide recess 28, a rearward component of the press force to the second guide recess 29 by the engaging pin 36 is relatively increased. Thus, it is possible to prevent the load of the rear shoe 21 (the electric motor 16) from being increased.

(2) In the present embodiment, the deflective portion 41 comes into contact with the bottom wall 34 at the buffer body 42 (the pressed portion 42*a*). Thus, the deflective portion 41 and the buffer body 42 are elastically deformed while being pressed against each other until transition to the tilt down state of the movable panel 12 is completed. Thus, by the cooperation of the deflective portion 41 and the buffer body 42, it is possible to further prevent the occurrence of striking sound when transition to the tilt down state of the movable panel 12 is completed.

(3) The resin deflective portion 41 having both sides fixed to and supported on the support bracket 22 may easily secure a required amount of elastic deformation.

(4) The rubber buffer body 42 provided on the bottom wall 34 may easily secure required durability.

(5) In the present embodiment, by the cooperation of the resin deflective portion 41 and the rubber buffer body 42, it is possible to appropriately adjust the amount of elastic deformation and the durability according to a required specification.

(6) In the present embodiment, by the first guide recess 28 having a very simplified shape to extend linearly, it is possible to cause the movable panel 12 to relatively slowly perform the tilt down operation. Alternatively, by the second guide recess 29 having a very simplified shape to extend linearly, it is possible to prevent the load of the rear shoe 21 from being increased.

The present embodiment may be implemented in the following modifications. The present embodiment and the following modifications may be implemented in combination with each other to the extent in which they do not technically conflict with each other.

In the above embodiment, instead of the engaging pin 36 penetrating the two vertical walls 33, a pair of engaging pins may be adopted, which protrude from the two vertical walls 33 so as to be opposite each other in the width direction of the vehicle. In this case, independent engaging pins penetrating the respective vertical walls 33 may be adopted, or an engaging pin integrally formed with each vertical wall 33 may be adopted.

In the above embodiment, only one engaging recess 37 may be formed in each rear shoe 21 at one side in the width direction of the vehicle. Then, only one guide protrusion 24 may also be formed in each support bracket 22 at one side to correspond to the engaging recess 37.

In the above embodiment, at least one of the first guide recess 28 and the second guide recess 29 may be curved as long as they extend obliquely upward and rearward of the vehicle.

In the above embodiment, the engaging recess 37 is formed in each rear shoe 21 so as to be recessed in the width direction of the vehicle and the guide protrusion 24 is formed on each support bracket 22 so as to protrude in the width direction of the vehicle, so that the engaging recess 37 and the guide protrusion 24 are engaged with each other. Conversely, an engaging portion may be formed on each rear shoe 21 so as to protrude in the width direction of the vehicle and a guide portion may be formed in each support bracket 22 so as to be recessed in the width direction of the vehicle, so that the engaging portion and the guide portion are engaged with each other. For example, a guide portion having a hole shape may be formed so as to be directly connected to the front end of the first guide recess 28, so that the engaging pin 36 is engaged with the guide portion.

In the above embodiment, the engaging pin 36 is formed on each rear shoe 21 so as to protrude in the width direction of the vehicle and the first and second guide recesses 28 and 29 are formed in each support bracket 22 so as to be recessed in the width direction of the vehicle, so that the engaging pin 36 and the first and second guide recesses 28 and 29 are engaged with each other. Conversely, an engaging portion may be formed in each rear shoe 21 so as to be recessed in the width direction of the vehicle and first and second guide portions may be formed on each support bracket 22 so as to protrude in the width direction of the vehicle, so that the engaging portion and the first and second guide portions are engaged with each other. For example, first and second guide portions having a substantially linear shape may be formed so as to be directly connected to the rear end of the guide protrusion 24, so that the engaging recess 37 is engaged with the first and second guide portions.

In the above embodiment, the contact between the deflective portion 41 and the bottom wall 34 (the buffer body 42) may begin in a state where the rear shoe 21 (the engaging flanges 35) moves on the rear inclined portion 27. That is, the rear inclined portion 27 may function as the first guide portion. In this case, the first guide recess 28 may be omitted.

In the above embodiment, instead of the resin deflective portion 41 having both sides fixed to and supported on the support bracket 22, a rubber buffer body similar to the buffer body 42 provided on the support bracket 22 may be adopted. In this case, it is possible to easily secure required durability.

In the above embodiment, instead of the rubber buffer body 42 provided on the bottom wall 34, a resin deflective portion similar to the deflective portion 41 having both sides fixed and supported on the bottom wall 34 may be adopted. In this case, it is possible to easily secure a required amount of elastic deformation.

In the above embodiment, the rubber buffer body 42 provided on the bottom wall 34 may be omitted. That is, the deflective portion 41 may be brought into direct contact with the bottom wall 34 at the time of the tilt down operation of the movable panel 12.

In the above embodiment, the resin deflective portion 41 having both sides fixed to and supported on the support bracket 22 may be omitted. That is, the support bracket 22 may be brought into direct contact with the buffer body 42 at the time of the tilt down operation of the movable panel 12.

Technical ideas that may be grasped from the above embodiment and the modifications will be described.

(A) In the sunroof device, at least one of the first guide portion and the second guide portion may linearly extend obliquely upward and rearward of the vehicle.

According to this configuration, by the first guide portion having a very simplified shape to extend linearly, it is possible to cause the movable panel to relatively slowly perform the tilt down operation. Alternatively, by the second guide portion having a very simplified shape to extend linearly, it is possible to prevent the load of the sliding member from being increased.

(B) A sunroof device includes a guide rail provided on each edge portion of an opening formed in a roof of a vehicle in a width direction of the vehicle, a sliding member supported on the guide rail so as to be slidable in a longitudinal direction of the vehicle, and a support member having a front end portion supported on the guide rail so as to be rotatable and slidable in the longitudinal direction of the vehicle, the support member supporting a movable panel that opens and closes the opening, the sliding member is provided with a second elastic member and includes a bottom wall located above the guide rail, a vertical wall provided upright on the bottom wall, and an engaging portion provided on the vertical wall, the support member includes a guide portion engaged with the engaging portion, the guide portion including a first guide portion that extends obliquely upward and rearward of the vehicle in a fully closed state where the movable panel closes the opening and a second guide portion that is connected to a rear end of the first guide portion and extends obliquely upward and rearward of the vehicle and more steeply than the first guide portion, and, when the sliding member moves to the rear of the vehicle with respect to the support member in the fully closed state, the engaging portion presses the guide portion to cause a tilt down operation of the movable panel, the support member comes into contact with the second elastic member in a first state where the engaging portion presses the first guide portion, and the second elastic member restricts movement of the sliding member to the rear of the vehicle with respect to the support member in a second state where the engaging portion that has passed through the first guide portion while elastically deforming the second elastic member and has entered the second guide portion presses the second guide portion.

According to this configuration, when the sliding member moves to the rear of the vehicle with respect to the support member in the fully closed state, the engaging portion presses the guide portion (the first and second guide portions) to cause the tilt down operation of the movable panel. At this time, in the first state where the engaging portion presses the first guide portion, the support member comes into contact with the second elastic member. Thus, during the period until the second state where the engaging portion presses the second guide portion, the second elastic member is elastically deformed while being pressed against the support member according to the tilt down operation of the movable panel. Then, in the second state where the engaging portion presses the second guide portion, the second elastic member restricts the movement of the sliding member to the rear of the vehicle with respect to the support member. At this time, the tilt down operation of the movable panel is restricted, and transition to the tilt down state is completed. When the sliding member further moves to the rear of the vehicle in this state, the movable panel moves, together with the support member having the second guide portion pressed by the engaging portion, to the rear of the vehicle in the tilt down state to open the opening.

Here, when the engaging portion presses the first guide portion, since the first guide portion is not steeper than the second guide portion, the amount of downward movement, i.e., the speed of downward movement, of the rear portion of the movable panel is smaller than the amount of movement of the sliding member. Thus, the support member comes into contact with the second elastic member in a state where the movable panel relatively slowly performs the tilt down operation. That is, restriction in the movement of the sliding member to the rear of the vehicle with respect to the support member by the second elastic member begins in a state where the movable panel relatively slowly performs the tilt down operation. Then, the second elastic member is elastically deformed while being pressed against the support member until transition to the tilt down state of the movable panel is completed. Thus, it is possible to prevent the occurrence of striking sound when transition to the tilt down state of the movable panel is completed.

A sunroof device according to an aspect of this disclosure includes a guide rail provided on each edge portion of an opening formed in a roof of a vehicle in a width direction of the vehicle, a sliding member supported on the guide rail so as to be slidable in a longitudinal direction of the vehicle, and a support member provided with a first elastic member and having a front end portion supported on the guide rail so as to be rotatable and slidable in the longitudinal direction of the vehicle, the support member supporting a movable panel that opens and closes the opening, in which the sliding member includes a bottom wall located above the guide rail, a vertical wall provided upright on the bottom wall, and an engaging portion provided on the vertical wall, the support member includes a guide portion engaged with the engaging portion, the guide portion including a first guide portion that extends obliquely upward and rearward of the vehicle in a fully closed state where the movable panel closes the opening and a second guide portion that is connected to a rear end of the first guide portion and extends obliquely upward and rearward of the vehicle and more steeply than the first guide portion, and, when the sliding member moves to a rear of the vehicle with respect to the support member in the fully closed state, the engaging portion presses the guide portion to cause a tilt down operation of the movable panel, the first elastic member comes into contact with the bottom wall in a first state where the engaging portion presses the first guide portion, and the first elastic member restricts movement of the sliding member to the rear of the vehicle with respect to the support member in a second state where the engaging portion that has passed through the first guide portion while elastically deforming the first elastic member and has entered the second guide portion presses the second guide portion.

According to this configuration, when the sliding member moves to the rear of the vehicle with respect to the support member in the fully closed state, the engaging portion presses the guide portion (the first and second guide portions) to cause the tilt down operation of the movable panel. At this time, in the first state where the engaging portion presses the first guide portion, the first elastic member comes into contact with the bottom wall. Thus, during the period until the second state where the engaging portion presses the second guide portion, the first elastic member is elastically deformed while being pressed against the bottom wall according to the tilt down operation of the movable panel. Then, in the second state where the engaging portion presses the second guide portion, the first elastic member restricts the movement of the sliding member to the rear of the vehicle with respect to the support member. At this time, the tilt down operation of the movable panel is restricted, and transition to the tilt down state is completed. When the sliding member further moves to the rear of the vehicle in this state, the movable panel moves, together with the support member having the second guide portion pressed by the engaging portion, to the rear of the vehicle in the tilt down state to open the opening.

Here, when the engaging portion presses the first guide portion, since the first guide portion is not steeper than the second guide portion, the amount of downward movement, i.e., the speed of downward movement, of the rear portion of the movable panel is smaller than the amount of movement of the sliding member. Thus, the first elastic member comes into contact with the bottom wall in a state where the movable panel relatively slowly performs the tilt down operation. That is, restriction in the movement of the sliding member to the rear of the vehicle with respect to the support member by the first elastic member begins in a state where the movable panel relatively slowly performs the tilt down operation. Then, the first elastic member is elastically deformed while being pressed against the bottom wall until transition to the tilt down state of the movable panel is completed. Thus, it is possible to prevent the occurrence of striking sound when transition to the tilt down state of the movable panel is completed.

It is preferable that the sunroof device further includes a second elastic member provided at a contact position where the first elastic member comes into contact with the bottom wall.

According to this configuration, the first elastic member comes into contact with the bottom wall at the second elastic member. Thus, the first elastic member and the second elastic member are elastically deformed while being pressed against each other until transition to the tilt down state of the movable panel is completed. Thus, by the cooperation of the first elastic member and the second elastic member, it is possible to further prevent the occurrence of striking sound when transition to the tilt down state of the movable panel is completed.

In the sunroof device, it is preferable that the first elastic member is one of a resin deflective portion having both sides fixed to and supported on the support member and a rubber buffer body.

According to this configuration, when the first elastic member is the resin deflective portion, it is possible to easily secure a required amount of elastic deformation. Alternatively, when the first elastic member is the rubber buffer body, it is possible to easily secure required durability.

In the sunroof device, it is preferable that the second elastic member is one of a resin deflective portion having both sides fixed to and supported on the bottom wall and a rubber buffer body.

According to this configuration, when the second elastic member is the resin deflective portion, it is possible to easily secure a required amount of elastic deformation. Alternatively, when the second elastic member is the rubber buffer body, it is possible to easily secure required durability.

In the sunroof device, it is preferable that the first elastic member is a resin deflective portion having both sides fixed to and supported on the support member, and the second elastic member is a rubber buffer body provided on the bottom wall.

According to this configuration, by cooperation of the resin deflective portion and the rubber buffer body (the first elastic member and the second elastic member), it is possible to appropriately adjust the amount of elastic deformation and the durability according to a required specification.

In the sunroof device, it is preferable that at least one of the first guide portion and the second guide portion linearly extends obliquely upward and rearward of the vehicle.

A sunroof device according to another aspect of this disclosure includes a guide rail provided on each edge portion of an opening formed in a roof of a vehicle in a width direction of the vehicle, a sliding member supported on the guide rail so as to be slidable in a longitudinal direction of the vehicle, and a support member having a front end portion supported on the guide rail so as to be rotatable and slidable in the longitudinal direction of the vehicle, the support member supporting a movable panel that opens and closes the opening, in which the sliding member includes a bottom wall provided with a second elastic member and located above the guide rail, a vertical wall provided upright on the bottom wall, and an engaging portion provided on the vertical wall, the support member includes a guide portion engaged with the engaging portion, the guide portion including a first guide portion that extends obliquely upward and rearward of the vehicle in a fully closed state where the movable panel closes the opening and a second guide portion that is connected to a rear end of the first guide portion and extends obliquely upward and rearward of the vehicle and more steeply than the first guide portion, and when the sliding member moves to a rear of the vehicle with respect to the support member in the fully closed state, the engaging portion presses the guide portion to cause a tilt down operation of the movable panel, the support member comes into contact with the second elastic member in a first state where the engaging portion presses the first guide portion, and the second elastic member restricts movement of the sliding member to the rear of the vehicle with respect to the support member in a second state where the engaging portion that has passed through the first guide portion while elastically deforming the second elastic member and has entered the second guide portion presses the second guide portion.

This disclosure has the effect of preventing the occurrence of striking sound when transition to the tilt down state of a movable panel is completed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof device comprising:
a guide rail provided on each edge portion of an opening formed in a roof of a vehicle in a width direction of the vehicle;
a sliding member supported on the guide rail so as to be slidable in a longitudinal direction of the vehicle; and
a support member provided with a first elastic member and having a front end portion supported on the guide rail so as to be rotatable and slidable in the longitudinal direction of the vehicle, the support member supporting a movable panel that opens and closes the opening,
wherein the sliding member includes a bottom wall located above the guide rail, a vertical wall provided upright on the bottom wall, and an engaging portion provided on the vertical wall,
the support member includes a guide portion engaged with the engaging portion, the guide portion including a first guide portion that extends obliquely upward and rearward of the vehicle in a fully closed state where the movable panel closes the opening and a second guide portion that is connected to a rear end of the first guide portion and extends obliquely upward and rearward of the vehicle and more steeply than the first guide portion, and
when the sliding member moves to a rear of the vehicle with respect to the support member in the fully closed state, the engaging portion presses the guide portion to cause a tilt down operation of the movable panel, the first elastic member comes into contact with the bottom wall in a first state where the engaging portion presses the first guide portion, and the first elastic member restricts movement of the sliding member to the rear of the vehicle with respect to the support member in a second state where the engaging portion that has passed through the first guide portion while elastically deforming the first elastic member and has entered and pressed the second guide portion.

2. The sunroof device according to claim 1, further comprising a second elastic member provided at a contact position where the first elastic member comes into contact with the bottom wall.

3. The sunroof device according to claim 1,
wherein the first elastic member is one of a resin deflective portion having both sides fixed to and supported on the support member and a rubber buffer body.

4. The sunroof device according to claim 2,
wherein the first elastic member is one of a resin deflective portion having both sides fixed to and supported on the support member and a rubber buffer body.

5. The sunroof device according to claim 2,
wherein the second elastic member is one of a resin deflective portion having both sides fixed to and supported on the bottom wall and a rubber buffer body.

6. The sunroof device according to claim 2,
wherein the first elastic member is a resin deflective portion having both sides fixed to and supported on the support member, and
the second elastic member is a rubber buffer body provided on the bottom wall.

7. The sunroof device according to claim 1,
wherein at least one of the first guide portion and the second guide portion linearly extends obliquely upward and rearward of the vehicle.

8. A sunroof device comprising:
a guide rail provided on each edge portion of an opening formed in a roof of a vehicle in a width direction of the vehicle;
a sliding member supported on the guide rail so as to be slidable in a longitudinal direction of the vehicle; and
a support member having a front end portion supported on the guide rail so as to be rotatable and slidable in the longitudinal direction of the vehicle, the support member supporting a movable panel that opens and closes the opening,
wherein the sliding member includes a bottom wall provided with a second elastic member and located above the guide rail, a vertical wall provided upright on the bottom wall, and an engaging portion provided on the vertical wall,
the support member includes a guide portion engaged with the engaging portion, the guide portion including a first guide portion that extends obliquely upward and rearward of the vehicle in a fully closed state where the movable panel closes the opening and a second guide portion that is connected to a rear end of the first guide portion and extends obliquely upward and rearward of the vehicle and more steeply than the first guide portion, and
when the sliding member moves to a rear of the vehicle with respect to the support member in the fully closed state, the engaging portion presses the guide portion to cause a tilt down operation of the movable panel, the support member comes into contact with the second elastic member in a first state where the engaging portion presses the first guide portion, and the second elastic member restricts movement of the sliding member to the rear of the vehicle with respect to the support member in a second state where the engaging portion that has passed through the first guide portion while elastically deforming the second elastic member and has entered and pressed the second guide portion.

* * * * *